April 4, 1950   N. ENGELMANN   2,503,033
PLASTIC JACKETED GLASS ARTICLES
Filed Nov. 21, 1945
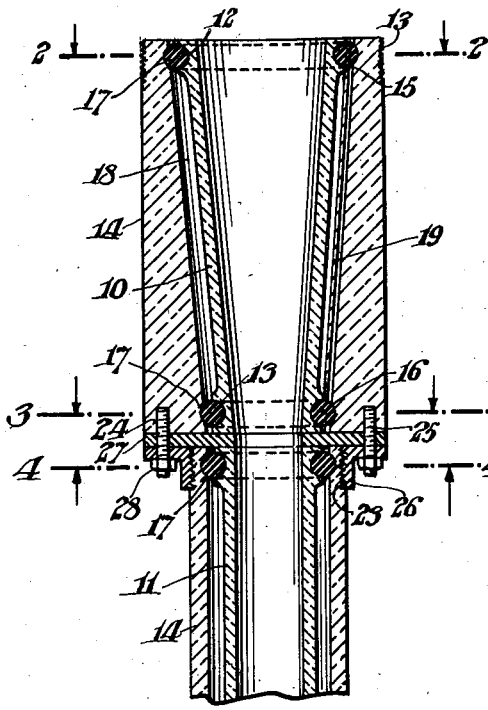
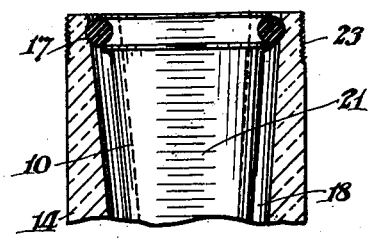
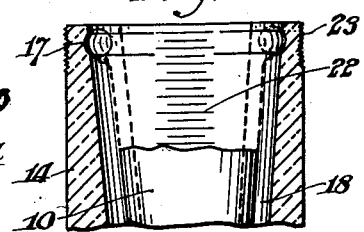
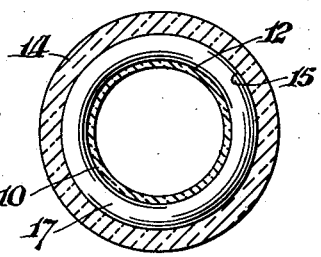
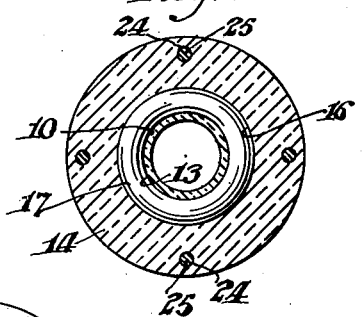
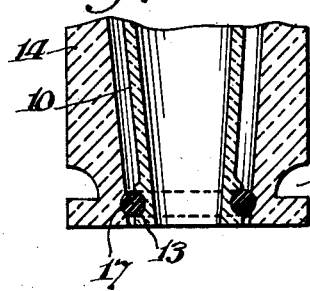
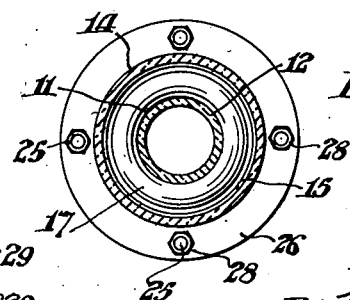
Inventor:
Nikolaus Engelmann,
By W. W. Williamson
Attorney.

Patented Apr. 4, 1950

2,503,033

UNITED STATES PATENT OFFICE 2,503,033

PLASTIC JACKETED GLASS ARTICLES

Nikolaus Engelmann, Philadelphia, Pa.

Application November 21, 1945, Serial No. 630,014

6 Claims. (Cl. 73—209)

My invention relates to new and useful plastic jacketed glass articles, and particularly to any type of tubular or hollow glass items which it is desirable to protect from exterior shock or blows and still be visible in order that an attendant may ascertain or know at all times what is taking place within the glass article.

Another object of the invention is to provide a metering tapered glass tube especially adapted for use in flow meters of the type in which the position of a flow indicating float, disposed in a generally upright metering tube, indicates the rate of flow of fluid passing through the meter and to encircle said metering tube with a plastic jacket uniquely connected thereto.

Another object of the invention is to provide a device of this character which is well fitted for use in connection with fluids which tend to congeal or coagulate or materially to change their viscosity, by providing a static air space between the glass article and its jacket, thereby reducing the passage of heat or cold to a minimum.

Another object of the invention is to provide a transparent plastic jacket or tube, either straight or tapered, and of any desirable cross sectional configuration fitted on a similarly shaped glass tube or article, and held in place on the glass article by annular elastic or compressible rings of suitable material, such as rubber, that will compensate for any small amount of difference in their co-efficients of expansion.

A further object of the invention is to provide a glass article having annular grooves on the exterior circumference in spaced relation, and a similarly shaped plastic outer jacket or shell having annular grooves on the interior circumference and aligned with the grooves in the glass article, said grooves adapted to receive rings of elastic or compressible material for detachably connecting said jacket or shell to the glass article.

A still further object of this invention is to provide a plastic jacketed glass article, wherein the plastic jacket is of sufficient dimensions to permit threading or boring and tapping thereof for the reception of securing devices, whereby two such articles may be connected together.

Another object of the invention is to provide a plastic jacketed glass article in which the jacket is spaced from said glass article to provide a chamber to contain graduations delineated on a surface of either the tube or jacket or on a scale member inserted in said chamber, said scale member either being opaque with the graduations delineated on one face, or transparent whereby the graduations will be visible from either of two opposite sides of the device.

With the above and other objects in view, this invention consists of the details of construction and combination of elements hereinafter set forth and then designated by the claims.

In order that those skilled in the art to which this invention appertains may understand how to make and use the same, I will describe its construction in detail, referring by numerals to the accompanying drawing forming a part hereof, in which:

Fig. 1 is a vertical sectional view of a plastic jacketed metering tube and a portion of a plastic jacketed straight glass tube joined together by a combination of coupling means.

Fig. 2 is a section on the line 2—2 of Fig. 1.

Fig. 3 is a section on the line 3—3 of Fig. 1.

Fig. 4 is a section on the line 4—4 of Fig. 1.

Fig. 5 is a fragmentary longitudinal sectional view of a plastic jacketed metering tube showing another means of providing a scale.

Fig. 6 is a fragmentary sectional elevation of a plastic jacketed metering tube showing still another means for providing a scale.

Fig. 7 is a fragmentary longitudinal sectional view of a plastic jacketed glass article showing another form of coupling means.

In carrying out my invention as herein embodied 10 and 11 represent glass articles or tubes or other hollow items which may be of any desirable shape, size, dimensions or cross-sectional configuration. For purposes of illustration, a glass article 10 which is transparent, is shown as a metering tube and tapers from one end to the other, while the glass article 11 is depicted as a straight transparent glass tube such as is used as a conduit or pipe. The glass article of any form has at least two annular grooves 12 and 13 appropriately spaced apart, for example, one located adjacent each end of the tube.

The glass article is encircled by a transparent plastic jacket or shell 14 which has at least two annular grooves 15 and 16 on its inner circumference, spaced apart equally to the spacing of the grooves 12 and 13 on the glass article with which the plastic jacket is associated, whereby, when the jacket is placed on the glass article, the groove at one location on the plastic jacket will be opposite to or aligned with the groove in a similar position on the glass article.

Rings 17 of elastic, resilient or compressible material are located in each pair of cooperating grooves and securely connect the two items together while permitting their disconnection and allowing for at least a small amount of expansion and contraction between the two items.

In connecting the two articles in this manner, their adjacent walls are spaced apart to provide a chamber 18 which forms a good insulating means due to the static air condition therein and also functions as a holder for a gauge means 19, Fig. 1. This gauge means may be an opaque card with the graduations delineated on an inner face so that when viewing the device from the side opposite said gauge member, the graduations will be visible through one thickness of the transparent plastic jacket and two thicknesses of the glass article. By constructing the gauge member 19 of transparent material it can be located in any suitable position and viewed from any direction. Said gauge member may be assembled between two of the connecting means 17 or it may be pasted in position or even allowed to merely rest on the bottom of the chamber 18.

In lieu of the gauge member 19, graduations 21 may be delineated on a face of the glass tube as shown in Fig. 5 or they may be delineated on a face of the transparent plastic jacket as indicated at 22 in Fig. 6, and especially on the inner face of said jacket.

The plastic jacket is made of sufficient thickness, dimensions or "body" to permit the formation of a thread 23 at either or both ends for attachment to metallic or other fittings or coupling means, or for the formation of longitudinally tapped holes 24 for the reception of metal or other studs 25, screws or the like. For convenience of illustration, the plastic jacket 14 surrounding the glass article 11 is shown as being exteriorly threaded at 23 with a metal or other flange 26 screwed thereon and attached to the jacket of the other glass article 10 by means of studs 25 which project through the packing 27 and the out turned toe of the flange with nuts 28 screwed on to the studs. The plastic jacket may have one or more grooves 29 adjacent one or both ends thereof to produce a collar 30 which may be engaged by fastening devices or bored for the reception of bolts or the like.

From the foregoing it will be apparent that I have provided a unitary article which will resist all ordinary shocks that might occur to the device or the machine in which it is used, provides efficient insulation against severe or quick changes in temperature which might affect the viscosity of the fluid in the glass tube, and will compensate for any differences in the co-efficients of expansion of the glass and plastic.

Of course I do not wish to be limited to the exact details of construction herein shown and described, as these may be varied within the scope of the appended claims without departing from the spirit of my invention.

Having thus described my invention, what I claim as new and useful is:

1. A metering tapered glass tube, an outer transparent plastic tube, and flexible rings entirely within the ends of the outer tube and surrounding the inner tube for holding said tubes together concentrically and in spaced relation throughout the major portions of their lengths.

2. The structure in claim 1 in combination with a transparent scale member positioned in the space between said tubes.

3. A plastic jacketed glass article comprising a glass tube, a transparent plastic tube having an interior diameter between its ends greater than the exterior diameter of the glass tube and surrounding the latter, and rings having resilient, elastic and compressible qualities located wholly within the ends of the tubes to connect them together as a unitary item.

4. In a device of the kind described, a glass tube having an annular groove at each end in the exterior circumference, a plastic tube having an annular groove at each end in the interior circumference, said plastic tube telescopically mounted over the glass tube, means in said grooves to hold the two tubes in generally fixed relation, while permitting expansion and contraction of either tube.

5. In a device of the kind described, a glass tube having an annular groove around the outer circumference near both ends to hold a flexible ring, an outer transparent plastic tube having an annular groove around the inner circumference near both ends, the grooves in both tubes being equally spaced apart, flexible rings tightly fitting in said grooves to hold the glass tubing securely in place inside of the transparent plastic tubing, said plastic tubing resisting shocks from the outside and the flexible rings being shock absorbing, whereby the glass tube is practically shock proof.

6. In a device of the kind described, a tapered glass tube having an annular groove at each end in the exterior circumference, a plastic tube of substantially the same diameter throughout its entire length and having an annular groove at each end in the interior circumference, said plastic tube telescopically mounted over the glass tube, and means in said grooves to hold the two tubes in generally fixed relation, while permitting expansion and contraction of either tube.

NIKOLAUS ENGELMANN.

REFERENCES CITED

The following references are of record in the file of this patent:

UNITED STATES PATENTS

| Number | Name | Date |
|---|---|---|
| 1,923,192 | Edelmann | Aug. 22, 1933 |
| 1,975,269 | Gray | Oct. 12, 1934 |
| 2,255,921 | Fear | Sept. 16, 1941 |
| 2,333,884 | Porter | Nov. 9, 1943 |
| 2,342,441 | Will | Feb. 22, 1944 |
| 2,390,445 | Mercier | Dec. 4, 1945 |
| 2,414,086 | Brewer | Jan. 14, 1947 |
| 2,439,614 | Schramm | Apr. 13, 1948 |

OTHER REFERENCES

Page 309 of Catalogue R41 of Phipps and Bird, Inc., Scientific Laboratory Apparatus, Richmond, Va. Copyright, 1941.